US011241941B2

(12) United States Patent
Nakashima

(10) Patent No.: US 11,241,941 B2
(45) Date of Patent: Feb. 8, 2022

(54) BLOWING DEVICE OF AIR CONDITIONER

(71) Applicant: HONDA MOTOR CO., LTD., Tokyo (JP)

(72) Inventor: Yu Nakashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 16/339,440

(22) PCT Filed: Jul. 24, 2017

(86) PCT No.: PCT/JP2017/026655
§ 371 (c)(1),
(2) Date: Apr. 4, 2019

(87) PCT Pub. No.: WO2018/074022
PCT Pub. Date: Apr. 26, 2018

(65) Prior Publication Data
US 2019/0283544 A1    Sep. 19, 2019

(30) Foreign Application Priority Data

Oct. 17, 2016  (JP) ............................. JP2016-203786

(51) Int. Cl.
*B60H 1/34*       (2006.01)
*F24F 13/06*      (2006.01)
*F24F 13/15*      (2006.01)

(52) U.S. Cl.
CPC ............. *B60H 1/3428* (2013.01); *B60H 1/34* (2013.01); *F24F 13/06* (2013.01); *F24F 13/15* (2013.01)

(58) Field of Classification Search
CPC ...... B60H 1/3428; B60H 1/34; B60H 1/3421; B60H 1/345; F24F 13/06; F24F 13/15
See application file for complete search history.

(56) References Cited

U.S. PATENT DOCUMENTS

| 4,326,452 A * | 4/1982 | Nawa ........................ F15D 1/08 |
| | | 454/258 |
| 2013/0225058 A1* | 8/2013 | Ross .................... B60H 1/3421 |
| | | 454/155 |

(Continued)

FOREIGN PATENT DOCUMENTS

| CN | 103791602 | 5/2014 |
| CN | 105682958 | 6/2016 |

(Continued)

OTHER PUBLICATIONS

International Search Report and Written Opinion for International Application No. PCT/JP2017/026655 dated Aug. 29, 2017, 11 pgs.

(Continued)

*Primary Examiner* — Steven B Mcallister
*Assistant Examiner* — Charles R Brawner
(74) *Attorney, Agent, or Firm* — Amin, Turocy & Watson, LLP

(57) ABSTRACT

A blowing device of an air conditioner includes a case (20) connected to an air conditioner of a vehicle; a ventilating flow path (50) formed from an inlet port (50c) to an outlet port (50d) of the case (20); a first inclined portion (51) provided on the inlet port (50c) side of the case (20); a second inclined portion (52) provided on the outlet port (50d) side of the case (20); an intermediate portion (53) formed between the first inclined portion (51) and the second inclined portion (52) in the case (20); and an airflow direction changing device (40) provided in the ventilating flow path (50) and capable of changing an airflow direction of an inflow wind through the inlet port (50c) toward a space between the outlet port (50d) and the intermediate portion (53), wherein the airflow direction changing device (40) includes a plurality of fins (40f) inclined in conjunction with each other.

6 Claims, 9 Drawing Sheets

(56) References Cited

U.S. PATENT DOCUMENTS

| | | | |
|---|---|---|---|
| 2014/0302769 A1 | 10/2014 | Sawada | |
| 2014/0308889 A1* | 10/2014 | Oe | B60H 1/345 |
| | | | 454/315 |
| 2014/0357179 A1* | 12/2014 | Londiche | F24F 13/075 |
| | | | 454/322 |
| 2016/0152116 A1* | 6/2016 | Albin | B60H 1/3421 |
| | | | 454/155 |
| 2016/0288624 A1* | 10/2016 | Albin | B60H 1/3421 |
| 2017/0158029 A1* | 6/2017 | Eltrop | B60H 1/3428 |

FOREIGN PATENT DOCUMENTS

| | | | | |
|---|---|---|---|---|
| DE | 102013209430 B3 * | 9/2014 | | F24F 13/075 |
| DE | 202014104226 | 11/2014 | | |
| DE | 102014009850 A1 * | 12/2014 | | B60H 1/345 |
| DE | 102014216573 | 2/2016 | | |
| DE | 102016122142 A1 * | 5/2018 | | B60H 1/3421 |
| GB | 1227157 | 4/1971 | | |
| JP | 60-155844 | 10/1985 | | |
| JP | 02-021112 | 2/1990 | | |
| JP | 2002-337544 | 11/2002 | | |
| JP | 2014-091376 | 5/2014 | | |
| WO | 2013-061636 | 5/2013 | | |
| WO | 2013-069316 | 5/2013 | | |

OTHER PUBLICATIONS

Indian Office Action for Indian Patent Application No. 201947014622 dated Jul. 21, 2020.

German Office Action for German Patent Application No. 112017005241.6 dated Jun. 23, 2020.

Chinese Office Action for Chinese Patent Application No. 201780062486.3 dated Sep. 2, 2021.

* cited by examiner (a)

(b)

(a)

(b)

BLOWING DEVICE OF AIR CONDITIONER

TECHNICAL FIELD

The present invention relates to a blowing device of an air conditioner.

Priority is claimed on Japanese Patent Application No. 2016-203786, filed Oct. 17, 2016, the content of which is incorporated herein by reference.

BACKGROUND ART

Air conditioners are installed in vehicles. Air conditioned using an air conditioner is blown from blowing devices (registers) into the vehicle interior. Blowing devices may include airflow direction changing device (louvers). Airflow direction changing device are formed to be able to change the airflow direction in a leftward/rightward direction and an upward/downward direction in a vehicle.

In recent years, a blowing device which includes an inclined surface in addition to an airflow direction changing device has been proposed (for example, refer to Patent Document 1). This blowing device changes an airflow direction toward the inclined surface using an airflow direction changing device. Moreover, the blowing device blows air in a predetermined direction along a surface of the inclined surface. This blowing device includes one fin as an airflow direction changing device.

CITATION LIST

Patent Document

[Patent Document 1]
Japanese Unexamined Patent Application, First Publication No. 2014-91376

SUMMARY OF INVENTION

Technical Problem

In the above-described blowing device, when the fin is rotated to an intermediate position, an airflow direction of a part of an inflow wind is changed to that toward the inclined surface, but the remaining portion of the inflow wind moves forward in a state in which an airflow direction thereof is not changed. For this reason, it is difficult to accurately control the airflow direction of a blown wind.

Therefore, an objective of the present invention is to provide a blowing device of an air conditioner capable of accurately controlling the airflow direction of a blown wind.

Solution to Problem

In order to accomplish the above-described objective, the blowing device of the air conditioner in the present invention adopts the following constitution.

(1) A blowing device of an air conditioner (for example, an air conditioner 3 in an embodiment) includes: a case (for example, a case 20 in the embodiment) connected to the air conditioner of a vehicle (for example, a vehicle 1 in the embodiment) via a duct (for example, a duct 5 in the embodiment); an inlet port (for example, an inlet port 50c in the embodiment) provided on the duct side of the case and connected to the duct; an outlet port (for example, an outlet port 50d in the embodiment) provided on a vehicle interior (for example, a vehicle interior 1a in the embodiment) side of the case and configured to blow out wind toward the vehicle interior; a ventilating flow path (for example, a ventilating flow path 50 in the embodiment) formed inside the case through which wind is able to pass in a ventilating direction (for example, an X direction in the embodiment) from the inlet port to the outlet port; a first inclined portion (for example, a first inclined portion 51 in the embodiment) provided on the inlet port side in the case and inclined in a direction outward from the case with respect to the ventilating direction; a second inclined portion (for example, a second inclined portion 52 in the embodiment) provided on the outlet port side in the case and inclined in a direction inward into the case with respect to the ventilating direction; an intermediate portion (for example, an intermediate portion 53 in the embodiment) formed between the first inclined portion and the second inclined portion in the case; and an airflow direction changing device (for example, an airflow direction changing device 40 in the embodiment) provided in the ventilating flow path and capable of changing an airflow direction of an inflow wind through the inlet port toward a space between the outlet port and the intermediate portion, wherein the airflow direction changing device includes a plurality of fins (for example, a plurality of fins 40f in the embodiment) which incline in conjunction with each other.

According to this constitution, when the airflow direction changing device is rotated to the intermediate position, the airflow direction of most of the wind flowing into the ventilating flow path is changed by the plurality of fins. That is to say, there is less airflow which travels without an airflow direction thereof being changed. For this reason, it is easy to blow out wind in a predetermined direction along a surface of a second inclined portion and it is possible to accurately control an airflow direction.

(2) The plurality of fins include a first fin (for example, a first fin 41 in the embodiment) and a second fin (for example, a second fin 42 in the embodiment) disposed side by side in a first direction (for example, a Z direction in the embodiment) and disposed at both end portions in the first direction, and an interval (for example, W2 in the embodiment) in the first direction between an end portion (for example, an end portion 41c in the embodiment) of the first fin on the inlet port side and an end portion (for example, an end portion 42c in the embodiment) of the second fin on the inlet port side is set to an opening width (for example, W1 in the embodiment) or more in the first direction of the inlet port.

According to this constitution, airflow directions of all of the wind flowing into the ventilating flow path through the inlet port are changed by the plurality of fins. That is to say, there is no wind which moves forward without changing an airflow direction thereof. Therefore, it is possible to accurately control an airflow direction.

(3) The first fin and the second fin have states in which the first fin and the second fin are inclined in a direction inward into the case with respect to the ventilating direction.

According to this constitution, airflow directions of the winds which have flowed into both end portions in the first direction of the ventilating flow path are changed to a direction inward from the case by the first fin and the second fin. For this reason, the wind is blown out through the outlet port without colliding with the inner surface of the case around the outlet port. Therefore, it is possible to prevent the wind power of the blown wind from weakening due to a pressure loss.

(4) The plurality of fins include an intermediate fin (for example, an intermediate fin 43 in the embodiment) disposed between the first fin and the second fin in the first direction.

(5) The intermediate fin is formed to be longer than the first fin and the second fin in the ventilating direction.

According to these constitutions, when the plurality of fins are inclined to one side, the wind escaping to the other side is reduced. Therefore, it is possible to efficiently change an airflow direction of wind flowing into the ventilating flow path.

(6) An end portion of the intermediate fin on the inlet port side comes into contact with the inlet port at a maximum inclined position of the airflow direction changing device.

According to this constitution, when the plurality of fins are maximally inclined to one side, no wind escaping to the other side occurs. Therefore, it is possible to efficiently change an airflow direction of wind flowing into the ventilating flow path.

(7) The first inclined portion is formed in a curved surface shape along a movement locus of the end portion on the inlet port side of the first fin or the second fin.

According to this constitution, a gap between the first fin or the second fin and the first inclined portion is small. For this reason, when the plurality of fins are inclined to one side, the outflow of wind to the other side is suppressed. Therefore, it is possible to accurately control an airflow direction.

Advantageous Effects of Invention

According to the present invention, when an airflow direction changing device is rotated to an intermediate position, airflow directions of most of wind flowing into a ventilating flow path are changed by a plurality of fins. That is to say, there is less airflow which travels without an airflow direction thereof being changed. For this reason, it is easy to blow out wind in a predetermined direction along a surface of a second inclined portion and it is possible to accurately control an airflow direction.

DESCRIPTION OF EMBODIMENTS

An embodiment of a blowing device of an air conditioner in the present invention will be described below with reference to the accompanying drawings.

An X direction, a Y direction, and a Z direction used in the following description are defined as follows. The X direction is an extending direction (a ventilating direction) of a ventilating flow path formed inside a blowing device. A +X direction is an opening direction of an outlet port formed on a downstream side of the ventilating flow path. The Y direction and the Z direction are directions orthogonal to each other and are orthogonal to the X direction. For example, in the case in which a cross-sectional shape of the ventilating flow path orthogonal to the X direction is rectangular, a longer side direction is the Y direction and a shorter side direction is the Z direction. Furthermore, as an example in relation to a vehicle, the X direction is a forward/rearward direction of the vehicle and the +X direction is a direction from the front to the rear of the vehicle. The Y direction is a leftward/rightward (width) direction of the vehicle and a +Y direction is a direction from the right to the left when facing forward in the vehicle. The Z direction is an upward/downward direction of the vehicle and a +Z direction is a direction from the bottom to the top of the vehicle. Here, the X direction, the Y direction, and the Z direction are not limited to these examples.

Figure 1:
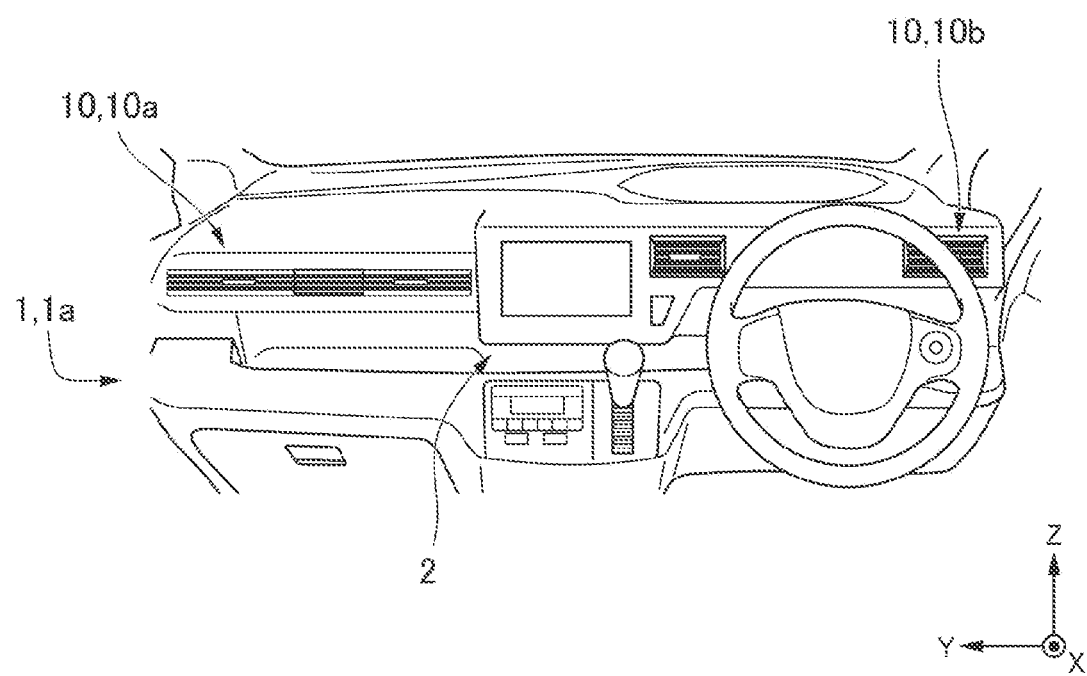
FIG. 1 is a front view of an instrument panel in a vehicle interior.
Figure 2:
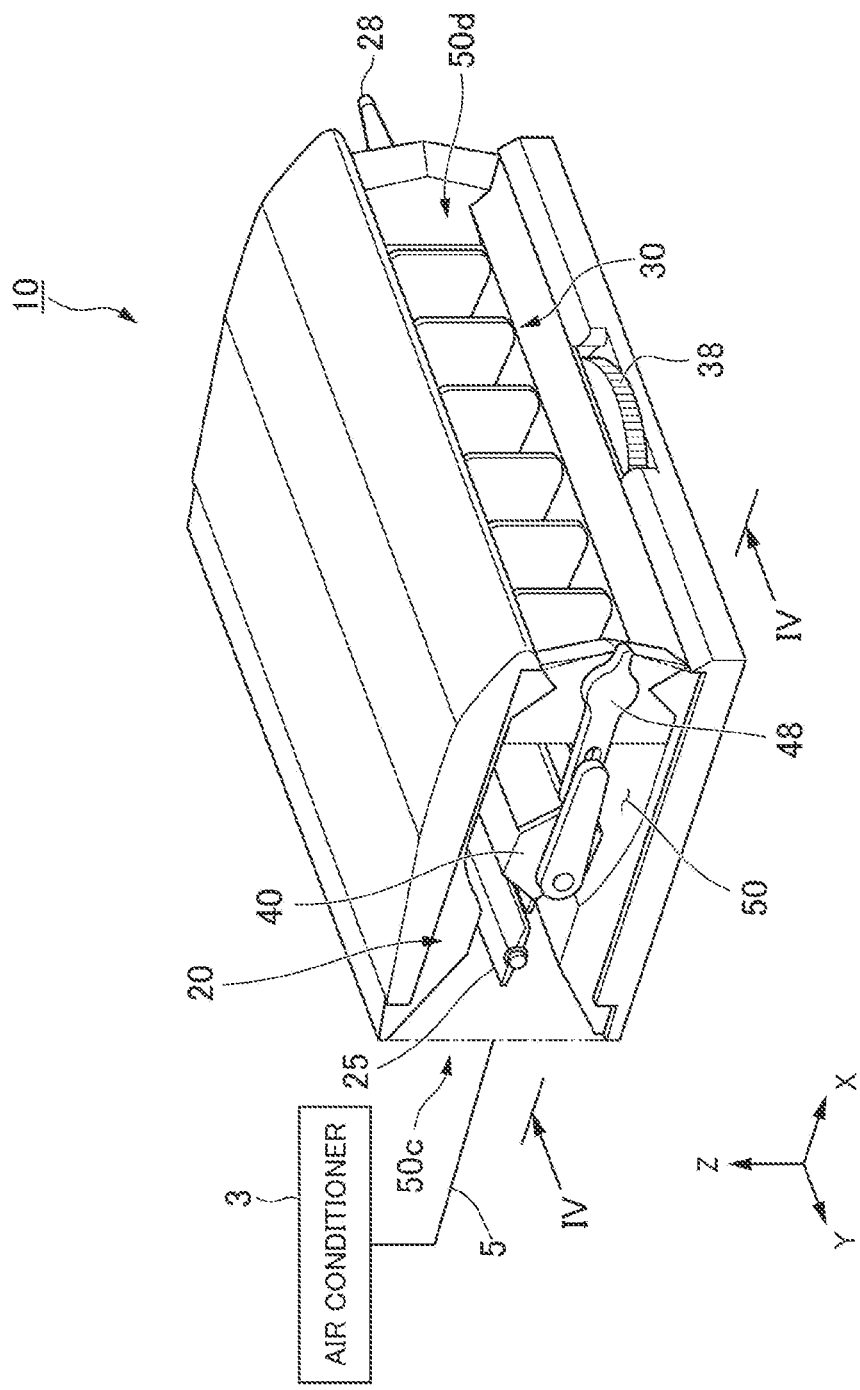
FIG. 2 is a perspective view of a blowing device in an embodiment.

FIG. 1 is a front view of an instrument panel in a vehicle interior. FIG. 2 is a perspective view of a blowing device in an embodiment. FIG. 2 shows an end surface of a case 20 in the +Y direction transparently to allow understanding of an internal structure of the blowing device 10. As shown in FIG. 2, the vehicle includes an air conditioner 3. The air conditioner 3 adjusts a temperature, a humidity, and the like of air in the vehicle interior. The blowing device (register) 10 is joined to the air conditioner 3 via a duct 5. The air having undergone adjustment in the air conditioner 3 is blown out from the blowing device 10 into the vehicle interior. As shown in FIG. 1, the blowing device 10 is disposed in an instrument panel 2 in a vehicle interior 1a of a vehicle 1. For example, the blowing device 10a is disposed on a passenger's seat side of the instrument panel 2 and the blowing device 10b is disposed on a driver's seat side.

Figure 3:
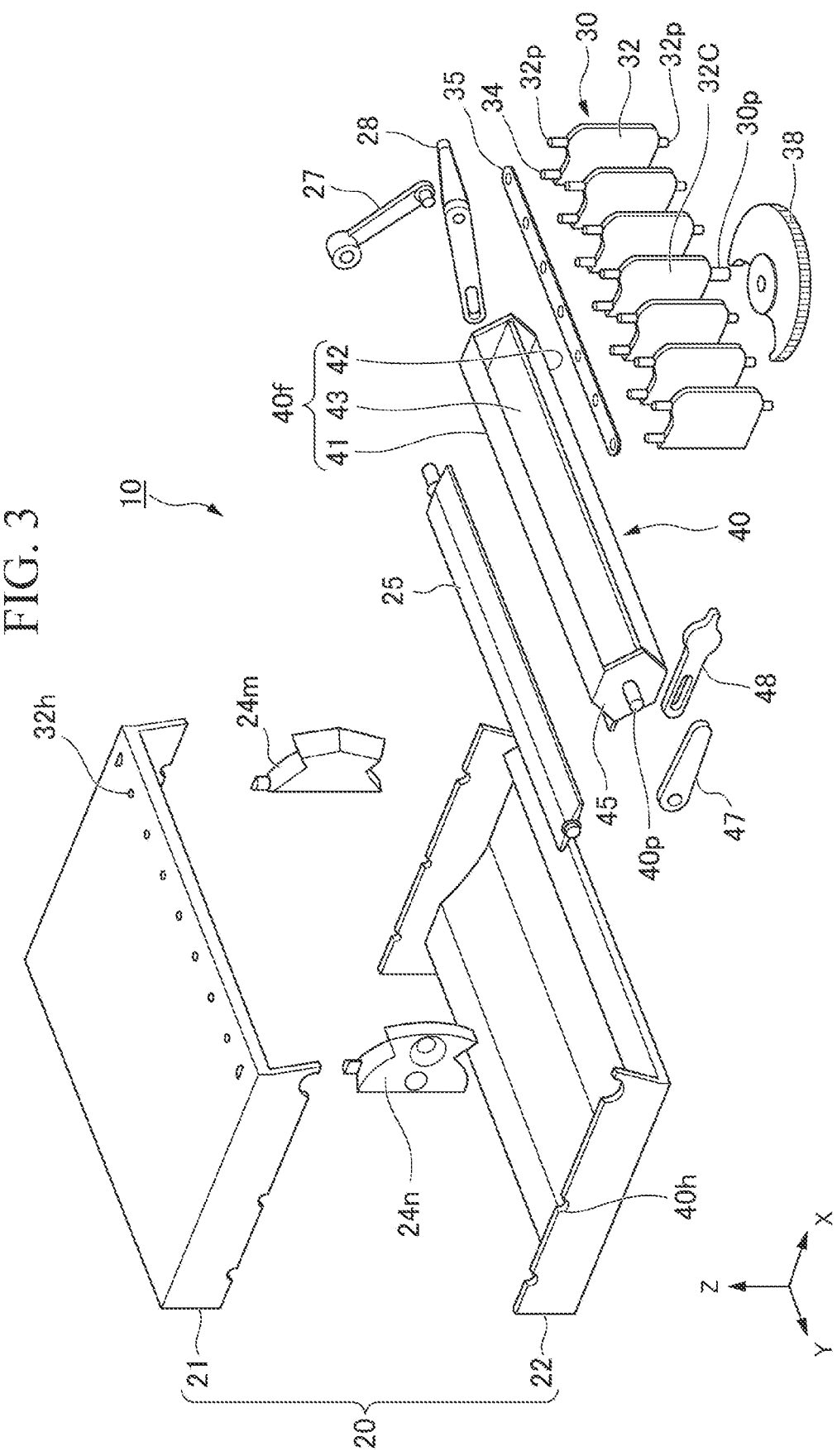
FIG. 3 is an exploded perspective view of the blowing device in the embodiment.

FIG. 3 is an exploded perspective view of the blowing device in the embodiment. As shown in FIG. 3, the blowing device 10 includes the case 20, a shutoff valve 25, a louver 30, and an airflow direction changing device 40. Members constituting the blowing device 10 are formed of a resin material, a metal material, or the like.

The case 20 includes a first case 21, a second case 22, and link supports 24m and 24n. The case 20 is divided into two parts in the Z direction. The first case 21 is disposed in the +Z direction and the second case 22 is disposed in a −Z direction. The link supports 24m and 24n are sandwiched between the first case 21 and the second case 22. The link supports 24m and 24n are disposed at both end portions in the Y direction.

Figure 4:
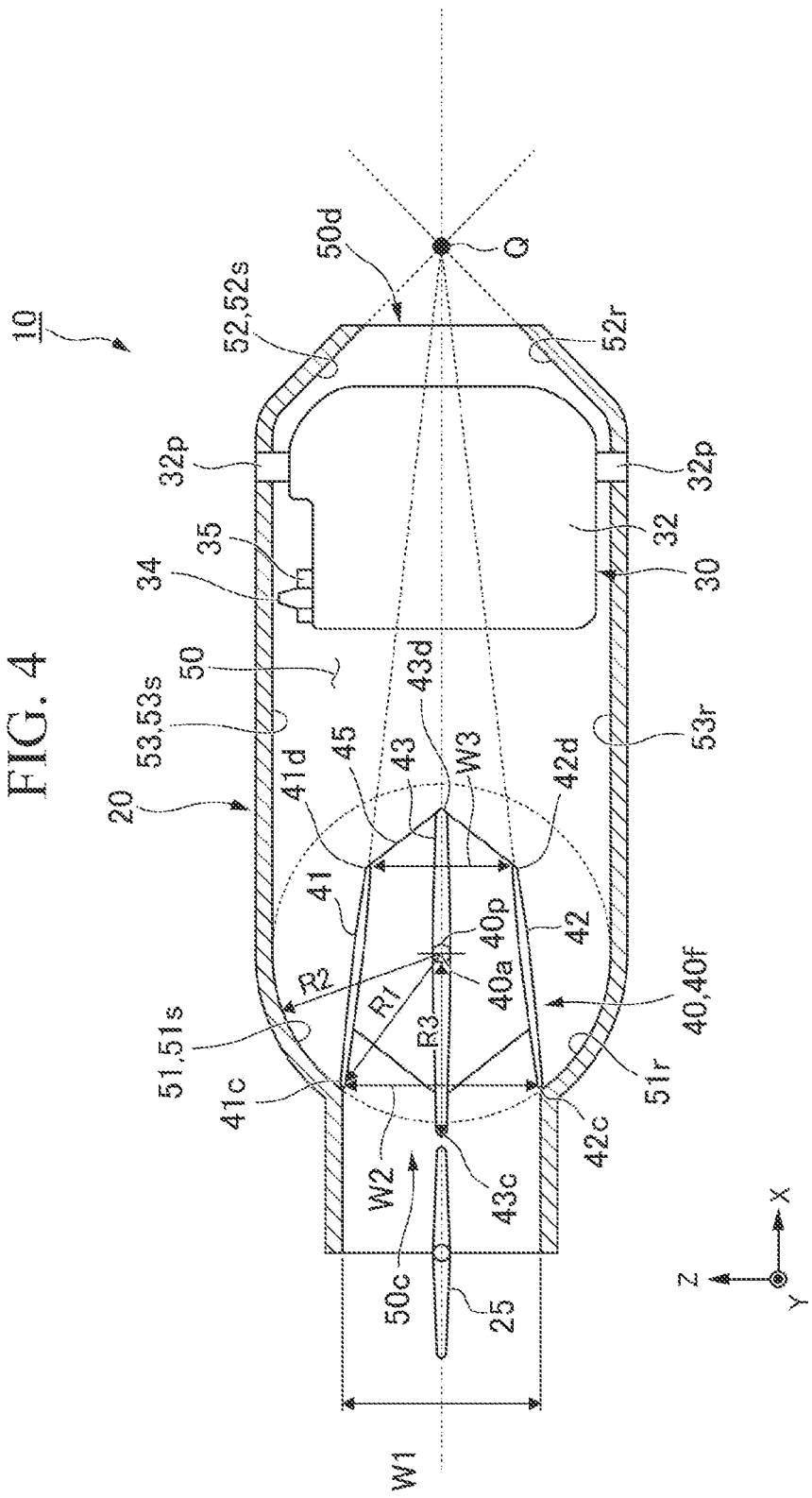
FIG. 4 is a cross-sectional view taken along line IV-IV in FIG. 2.

FIG. 4 is a cross-sectional view taken along line IV-IV in FIG. 2. The case 20 is connected to the air conditioner 3 of the vehicle via the duct 5 (refer to FIG. 2).

As shown in FIG. 4, the case 20 includes an inlet port 50c, an outlet port 50d, and a ventilating flow path 50. The inlet port 50c is provided at an end portion (the duct side) of the case 20 in a −X direction and is connected to the duct 5. The outlet port 50d is provided at an end portion (the vehicle interior side) of the case 20 in the +X direction and wind is blown out toward the vehicle interior through the outlet port 50d. The outlet port 50d opens in the +X direction. The ventilating flow path 50 extends between the inlet port 50c and the outlet port 50d inside the case 20. The ventilating flow path 50 is formed in the ventilating direction (X direction) from the inlet port 50c toward the outlet port 50d. That is to say, the inlet port 50c is formed on an upstream side of the ventilating flow path 50 in the ventilating direction and the outlet port 50d is formed on a downstream side thereof.

A first inclined portion 51, a second inclined portion 52, and an intermediate portion 53 are formed on an inner surface of the case 20.

The first inclined portion 51 is provided adjacent to the downstream side of the inlet port 50c of the case 20. The first inclined portion 51 is inclined to a direction outward from the case 20 with respect to the ventilating direction. That is to say, a first inclined portion 51s formed on the inner surface of the case 20 in the +Z direction (an inner surface facing in the −Z direction) is inclined in the +Z direction as it goes in the +X direction. Furthermore, a first inclined portion 51r formed on the inner surface of the case 20 in the −Z direction (the inner surface facing in the +Z direction) is inclined in the −Z direction as it goes in the +X direction. The first inclined portion 51 is formed in a curved surface shape to have a circular arc shape on a cross-sectional surface perpendicular to the Y direction (for example, FIG. 4).

The second inclined portion 52 is provided adjacent to an upstream side of the outlet port 50d in the case 20. The second inclined portion 52 is inclined in a direction inward into the case 20 with respect to the ventilating direction. That is to say, the second inclined portion 52s formed on the inner surface of the case 20 in the +Z direction (the inner surface facing in the −Z direction) is inclined in the −Z direction as it goes in the +X direction. Furthermore, the second inclined portion 52r formed on the inner surface of the case 20 in the −Z direction (the inner surface facing in the +Z direction) is inclined in the +Z direction as it goes in the +X direction. The second inclined portion 52 is formed in a planar shape to have a straight line shape on a cross-sectional surface perpendicular to the Y direction (for example, FIG. 4).

The intermediate portion 53 is formed between the first inclined portion 51 and the second inclined portion 52. The intermediate portion 53 is formed in a planar shape and is disposed parallel to an XY plane. The intermediate portion 53 continuously connects an end portion of the first inclined portion 51 in the +X direction and an end portion of the second inclined portion 52 in the −X direction.

The shutoff valve 25, the airflow direction changing device 40, and the louver 30 are provided in the ventilating flow path 50 in the case 20. The shutoff valve 25 is disposed in the inlet port 50c. The airflow direction changing device 40 is disposed adjacent to the downstream side of the inlet port 50c. The louver 30 is disposed adjacent to an upstream side of the second inclined portion 52.

As shown in FIG. 3, the shutoff valve 25 is formed in a rectangular flat plate shape whose longer side direction is the Y direction. The shutoff valve 25 is supported by the case 20 in a rotatable state. A first link member 27 and a second link member 28 are joined at an end portion of the shutoff valve 25 in the −Y direction in this order. The second link member 28 is supported by the link support 24m in a rotatable state. When an end portion of the second link member 28 in the +X direction is moved in the Z direction, the shutoff valve 25 rotates inside the case 20. The shutoff valve 25 adjusts the amount of wind inflow into the blowing device 10.

The louver 30 includes a plurality of vanes 32, a joining member 35, and a dial 38. Each of the vanes 32 is formed in a substantially quadrangular plate shape. The plurality of vanes 32 are disposed parallel to each other side by side in the Y direction. Rotatable pins 32p stand upright at both end portions of the vanes 32 in the Z direction. The rotatable pins 32p are inserted into holes 32h in the case 20. Thus, the vanes 32 are supported by the case 20 in a rotatable state. Joining pins 34 stand upright at positions at end portions of the vanes 32 in +Z direction and away from the rotatable pins 32p. For example, the rotatable pins 32p are disposed at end portions in the +X direction and the joining pins 34 are away from the rotatable pins 32p and are disposed on the end portions in the −X direction. The joining member 35 includes a plurality of holes. The joining pins 34 in the plurality of vanes 32 are inserted into the plurality of holes in the joining member 35. A central rotatable pin 30p stands upright at an end portion in the −Z direction of a central vane 32C disposed in a central portion in the Y direction. The dial 38 is joined to the central rotatable pin 30p in the central vane 32C. When the dial 38 is rotated, the central vane 32C rotates. In conjunction therewith, the plurality of vanes 32 joined through the joining member 35 rotate. The louver 30 changes an airflow direction in the Y direction of wind blown through the outlet port 50d by rotating the vanes 32.

The airflow direction changing device 40 includes a plurality of fins 40f, end plates 45, a third link member 47, and a fourth link member 48.

The plurality of fins 40f include a first fin 41, an intermediate fin 43, and a second fin 42 disposed side by side in the Z direction (first direction). Each of the plurality of fins 40f is formed in a rectangular flat plate shape whose longer side direction is the Y direction. The end plates 45 are disposed parallel to an XZ plane. The end plates 45 are fixed to both end portions of the plurality of fins 40f in the Y direction. The rotatable pins 40p stand upright on outer surfaces of the end plates 45 in the Y direction. The rotatable pins 40p are inserted into the holes 40h in the case 20. Thus, the airflow direction changing device 40 is supported by the case 20 in a rotatable state. The third link member 47 and the fourth link member 48 are joined to the rotatable pins 40p of the airflow direction changing device 40 in the +Y direction in this order. The fourth link member 48 is supported by the link support 24n in a rotatable state. When an end portion of the fourth link member 48 in the +X direction is moved in the Z direction, the airflow direction changing device 40 is rotated inside the case 20.

As shown in FIG. 4, the airflow direction changing device 40 is rotated about a central axis (rotational axis) 40a of the rotatable pin 40p. Examples of rotational positions of the airflow direction changing device 40 include a position in which the first fin 41 and the second fin 42 are plane-symmetrical with respect to the XY plane including the rotational axis 40a (a position in FIG. 4). This rotational position is referred to as a standard position of the airflow direction changing device 40. Furthermore, a state in which the airflow direction changing device 40 is in the standard position is referred to as a standard state of the airflow direction changing device 40. A constitution of the plurality of fins 40f in the standard state of the airflow direction changing device 40 will be described below.

The first fin 41 and the second fin 42 are disposed at both end portions of the airflow direction changing device 40 in the Z direction. The first fin 41 is disposed at an end portion in the +Z direction and the second fin 42 is disposed at an end portion in the −Z direction. The first fin 41 and the second fin 42 is inclined in a direction inward into the case 20 with respect to the X direction in the standard state of the airflow direction changing device 40. That is to say, the first fin 41 is inclined in the −Z direction as it goes in the +X direction. Furthermore, the second fin 42 is inclined in the +Z direction as it goes in the +X direction. Here, an interval between an end portion 41c of the first fin 41 in the −X direction and an end portion 42c of the second fin 42 in the −X direction is set to W2. In addition, an interval between an end portion 41d of the first fin 41 in the +X direction and an end portion 42d of the second fin 42 in the +X direction is set to W3. The first fin 41 and the second fin 42 are formed so that W2 is larger than W3. In the cross-sectional view in FIG. 4, an intersection point of an extension line of the second inclined portion 52s in the +Z direction and an extension line of the second inclined portion 52r in the −Z direction is set to Q. The intersection point Q is disposed in the +X direction from the outlet port 50d. At that time, an intersection point of an extension line of the first fin 41 and an extension line of the second fin is similarly Q.

As described above, the interval between the end portion 41c of the first fin 41 in the −X direction and the end portion 42c of the second fin 42 in the −X direction is set to W2. On the other hand, an opening width of the inlet port 50c in the Z direction is set to W1. The first fin 41 and the second fin 42 are formed so that W2 is W1 or more.

The first inclined portion 51 in the case 20 is formed in a curved surface shape along a rotation locus of the end portion 41c of the first fin 41 in the −X direction or the end portion 42c of the second fin 42 in the −X direction. The first inclined portion 51s is formed in a curved surface shape along the rotation locus of the end portion 41c of the first fin 41 in the −X direction. That is to say, a distance R2 from the rotational axis 40a of the airflow direction changing device 40 to the first inclined portion 51s is constant. Here, the distance from the rotational axis 40a to the end portion 41c of the first fin 41 in the −X direction is set to R1. The first inclined portion 51s is formed so that R2 is slightly larger than R1. Similarly, the first inclined portion 51r is formed in a curved surface shape along a rotation locus of the end portion 42c of the second fin 42 in the −X direction.

The intermediate fin 43 is disposed between the first fin 41 and the second fin 42 in the Z direction. The intermediate fin 43 is disposed parallel to the XY plane in the standard state of the airflow direction changing device 40. The intermediate fin 43 is formed to be longer than the first fin 41 and the second fin 42 in the X direction. An end portion 43d of the intermediate fin 43 in the +X direction is disposed in the +X direction from the end portion 41d of the first fin 41 in the +X direction and the end portion 42d of the second fin 42 in the +X direction. An end portion 43c of the intermediate fin 43 in the −X direction is disposed in the −X direction from the end portion 41c of the first fin 41 in the −X direction and the end portion 42c of the second fin 42 in the −X direction. When the airflow direction changing device 40 is maximally rotated, the end portion 43c of the intermediate fin 43 in the −X direction comes into contact with an inner surface of the inlet port 50c in the case 20. Here, the distance from the rotational axis 40a to the end portion 43c of the intermediate fin 43 in the −X direction is set to R3. As described above, the distance from the rotational axis 40a to the first inclined portion 51s is set to R2. The intermediate fin 43 is formed so that R3 is larger than R2.

An action of the blowing device 10 in the embodiment will be described.

Figure 5:
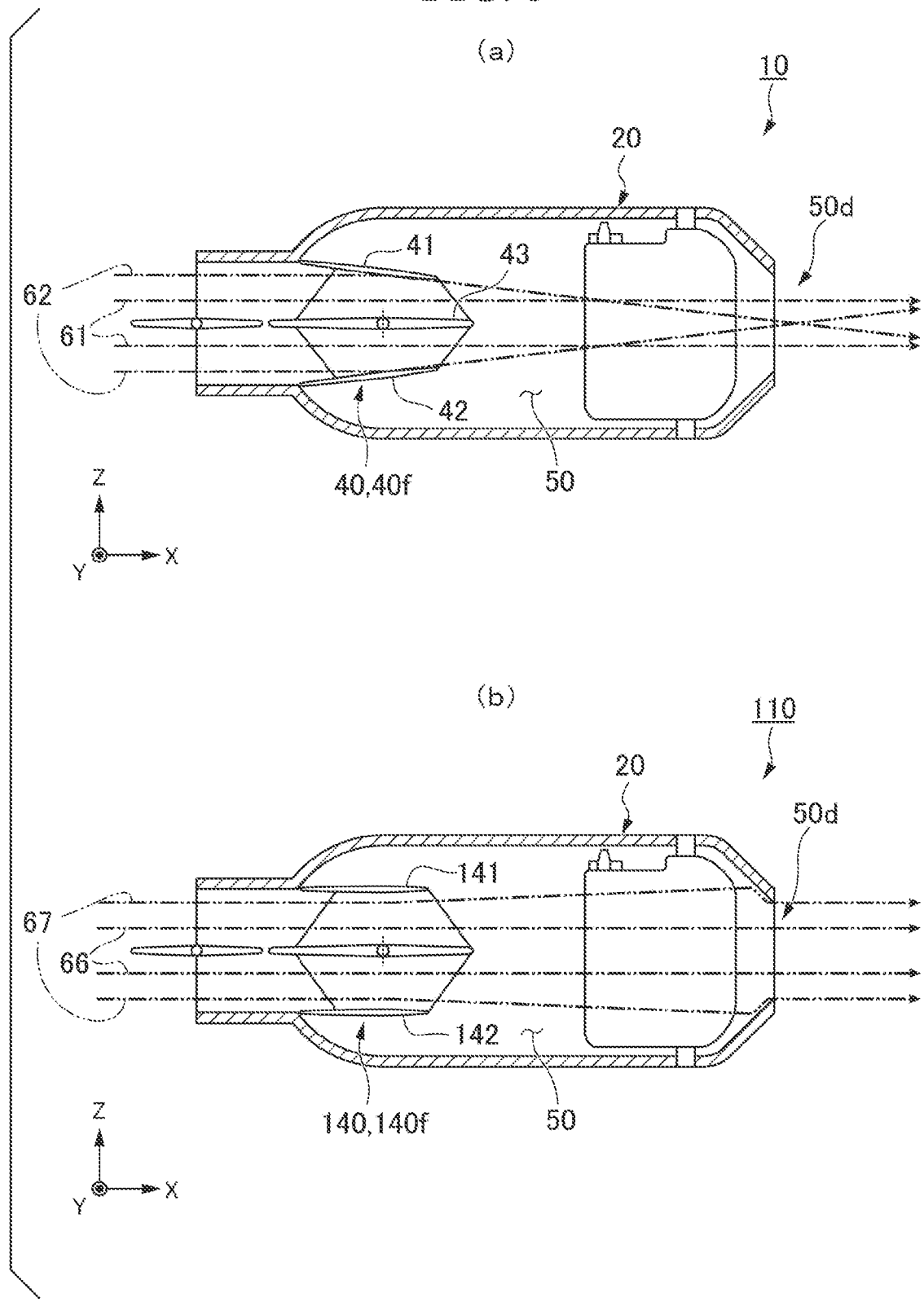
FIG. 5: (a) is an explanatory view of an action of the blowing device in the embodiment and shows a state in which an airflow direction changing device is rotated to a standard position and (b) is a blowing device in a modified example.
Figure 6:
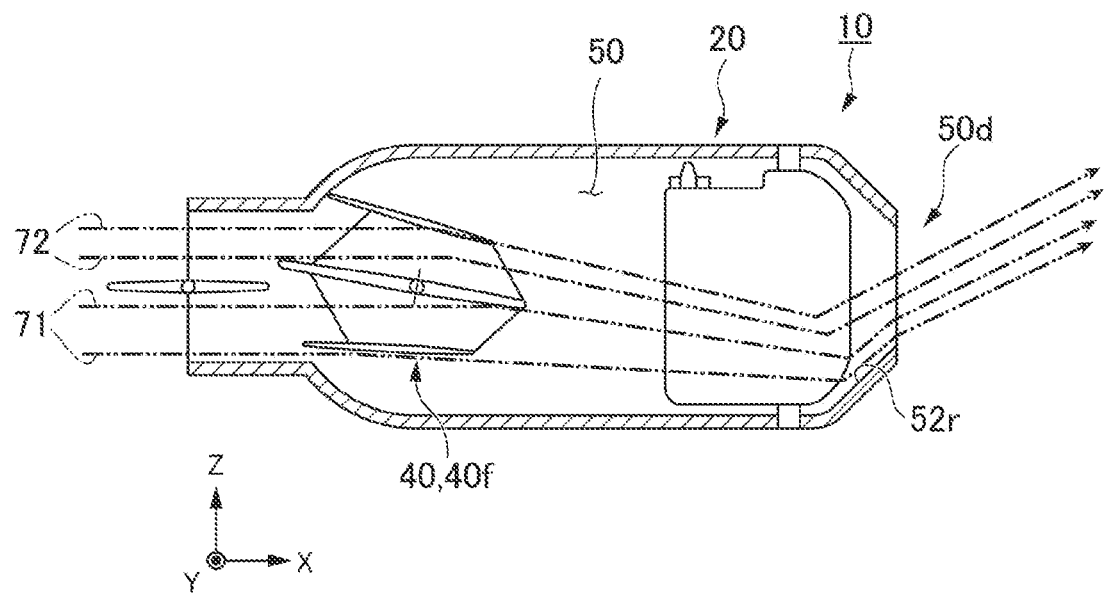
FIG. 6: (a) is an explanatory view of an action of the blowing device in the embodiment and shows a state in which the airflow direction changing device is rotated to an intermediate position and (b) is a blowing device in a comparative example.
Figure 6:
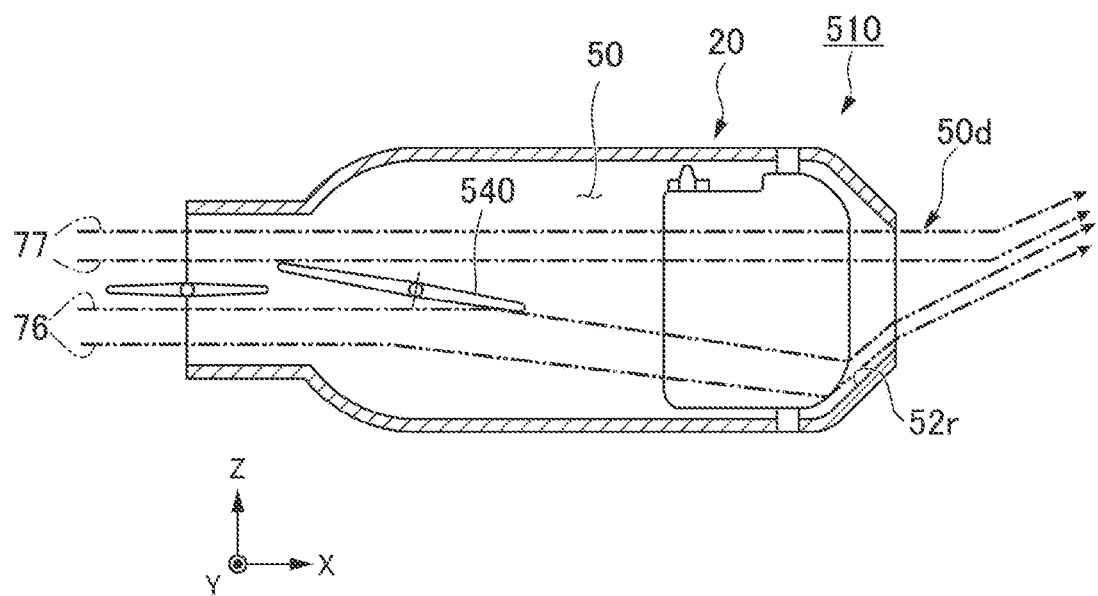
Figure 7:
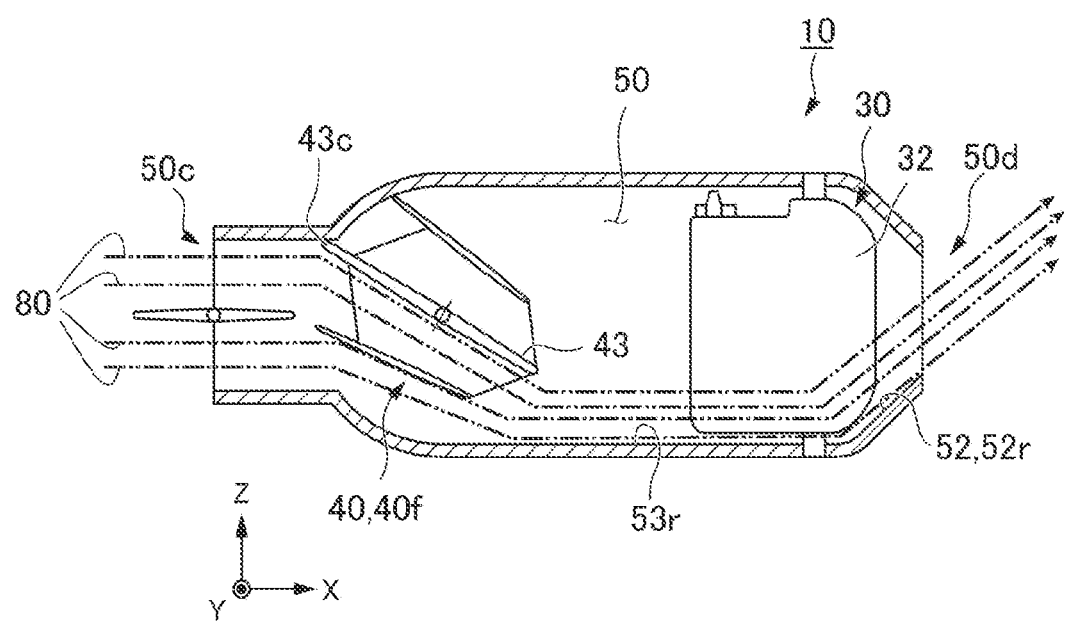
FIG. 7 is an explanatory view of an action of the blowing device in the embodiment and shows a state in which the airflow direction changing device is rotated to a maximum position.

FIGS. 5(a), 6(a), and 7 are explanatory views of actions of the blowing device in the embodiment. FIG. 5(a) shows a state in which the airflow direction changing device 40 is rotated to the standard position, FIG. 6(a) shows a state in which the airflow direction changing device 40 is rotated to the intermediate position, and FIG. 7 shows a state in which the airflow direction changing device 40 is rotated to the maximum position. Wind flows into the inlet port 50c of the blowing device 10 from the air conditioner 3 via the duct 5 (refer to FIG. 2).

As shown in FIG. 5(a), in a state in which the airflow direction changing device 40 is rotated to the standard position, the intermediate fin 43 is disposed parallel to the XY plane. For this reason, the airflow direction of wind 61 flowing into a central portion of the ventilating flow path 50 in the Z direction is not changed by the intermediate fin 43. The wind 61 passes through the ventilating flow path 50 without colliding with the inner surface of the case 20 and is blown out in the +X direction from the outlet port 50d. On the other hand, the first fin 41 and the second fin 42 are inclined in a direction inward into the case 20 with respect to the +X direction. For this reason, the airflow direction of wind 62 flowing into both end portions of the ventilating flow path 50 in the Z direction is changed in the direction inward from the case 20 by the first fin 41 and the second fin 42. Here, since inclination angles of the first fin 41 and the second fin 42 are small, the angle at which an airflow direction is changed is also small. For this reason, the wind 62 passes through the ventilating flow path 50 without colliding with the inner surface of the case 20 and is blown out through the outlet port 50d.

As shown in FIG. 6(a), in a state in which the airflow direction changing device 40 is rotated to the intermediate position, the plurality of fins 40f are inclined in the same direction. In the example in FIG. 6(a), the plurality of fins 40f are inclined in the −Z direction toward the +X direction. For this reason, an airflow direction of wind flowing into the ventilating flow path 50 is changed in a direction inclined from the +X direction to the −Z direction through the plurality of fins 40f. When the airflow direction of wind 71 which has flowed into the ventilating flow path 50 in the −Z direction (lower half portion) is changed as described above, the wind 71 collides with the second inclined portion 52r in the −Z direction. The airflow direction of the wind 71 is changed in a predetermined direction (the direction inclined from the +X direction to the +Z direction) along a surface of the second inclined portion 52r. On the other hand, even when the airflow direction of wind 72 which has flowed into the ventilating flow path 50 in the +Z direction (upper half portion) is changed in a direction inclined from the +X direction to the −Z direction through the plurality of fins 40f, the wind 72 does not collide with the second inclined portion 52r. Here, the wind 72 is subjected to the influence of the wind 71 whose airflow direction has been changed in a predetermined direction along the second inclined portion 52r and thus an airflow direction thereof is changed in a direction inclined from the +X direction to the +Z direction. Thus, the wind 71 and the wind 72 are blown out through the outlet port 50d in a direction inclined from the +X direction to the +Z direction.

As shown in FIG. 7, in a state in which the airflow direction changing device 40 is rotated to the maximum position, the end portion 43c of the intermediate fin 43 in the −Z direction comes into contact with the inner surface of the inlet port 50c in the case 20. In this state, the plurality of fins 40f are greatly inclined in the same direction. In the example in FIG. 7, the plurality of fins 40f are greatly inclined in the −Z direction toward the +X direction. For this reason, an airflow direction of wind 80 which has flowed into the ventilating flow path 50 is greatly changed in a direction inclined from the +X direction to the −Z direction through the plurality of fins 40f. The wind 80 collides with the intermediate portion 53r in the −Z direction of the case 20 and flows along a surface of the intermediate portion 53r. In addition, an airflow direction of the wind 80 is changed in a predetermined direction along the surface of the second inclined portion 52r. Moreover, the wind 80 is blown out through the outlet port 50d in a predetermined direction along the surface of the second inclined portion 52r.

In this way, in the blowing device 10 in the embodiment, the airflow direction changing device 40 and the second inclined portion 52 determine an airflow direction in the Z direction. The airflow direction in the Z direction is changed by rotating the plurality of fins 40f in the airflow direction changing device 40. Thus, it is possible to reduce the thickness of the blowing device 10. Furthermore, since the blowing angle in the Z direction is determined through the second inclined portion 52, wind can be blown out in a high angle range. In addition, when the outlet port 50d is viewed from the vehicle interior, only the louver 30 is visually recognized and the airflow direction changing device 40 is not visually recognized. Therefore, it is possible to improve the designability of the blowing device 10.

The ventilating flow path 50 has an elongated flow path cross section in which the Z direction is a shorter side direction and the Y direction is a longer side direction. For this reason, a contraction flow occurs on an upstream side of the airflow direction changing device 40. However, in the ventilating flow path 50, the airflow direction changing device 40, the louver 30, and the second inclined portion 52 are disposed in this order from the −X direction to the +X direction. In this case, no contraction flow occurs on a downstream side of the louver 30 and wind blown from the louver 30 is not pushed back by the contraction flow. Therefore, it is possible for the louver 30 to accurately control the airflow direction in the Y direction.

FIG. 6(b) is a cross-sectional view of a blowing device in a comparative example. A blowing device 510 in the comparative example includes one fin 540 as an airflow direction changing device. FIG. 6(b) shows a state in which the fin 540 is rotated to the intermediate position. When the airflow direction of wind 76 which has flowed into a ventilating flow path 50 in the −Z direction (lower half portion) is changed in a direction inclined from the +X direction to the −Z direction, the wind 76 collides with a second inclined portion 52r in the −Z direction. However, an airflow direction of wind 77 which has flowed into the ventilating flow path 50 in the +Z direction (upper half portion) goes straight without being changed in a direction inclined from the +X direction to the −Z direction. For this reason, the wind 76 and the wind 77 are blown out through the outlet port 50d in a direction slightly inclined from +X direction to the +Z direction. In this comparative example, the straight traveling wind 77 remains until the fin 540 is rotated to the maximum position. For this reason, it is difficult to blow wind in a predetermined direction along a surface of the second inclined portion 52r and it is difficult to control an airflow direction. Furthermore, when the fin 540 is rotated to the maximum position, an airflow direction is suddenly switched to a predetermined direction.

On the other hand, in the blowing device 10 in the embodiment shown in FIG. 6(a), an airflow direction changing device 40 includes a plurality of fins 40f which incline in conjunction with each other. According to this constitution, in a state in which the airflow direction changing device 40 is rotated to the intermediate position, most of wind which has flowed into a ventilating flow path 50 is changed in an airflow direction through the plurality of fins 40f. Thus, there is less airflow which travels without the airflow direction thereof being changed. Therefore, it is easy to blow out wind in a predetermined direction along the surface of the second inclined portion 52r and it is possible to accurately control an airflow direction. Furthermore, it is possible to change an airflow direction linearly in accordance with an amount of rotation of the airflow direction changing device 40.

Particularly, in the blowing device 10 in the embodiment, as shown in FIG. 4, an interval W2 between an end portion 41c of a first fin 41 in the −X direction and an end portion 42c of a second fin 42 in the −X direction is set to an opening width W1 or more of an inlet port 50c in the Z direction. According to this constitution, as shown in FIG. 6(a), in a state in which the airflow direction changing device 40 is rotated to the intermediate position, airflow directions of both winds 71 and 72 which has flowed into the ventilating flow path 50 are changed by the plurality of fins 40f. Therefore, it is easy to blow wind in a predetermined direction and it is possible to accurately control an airflow direction.

Figure 8:
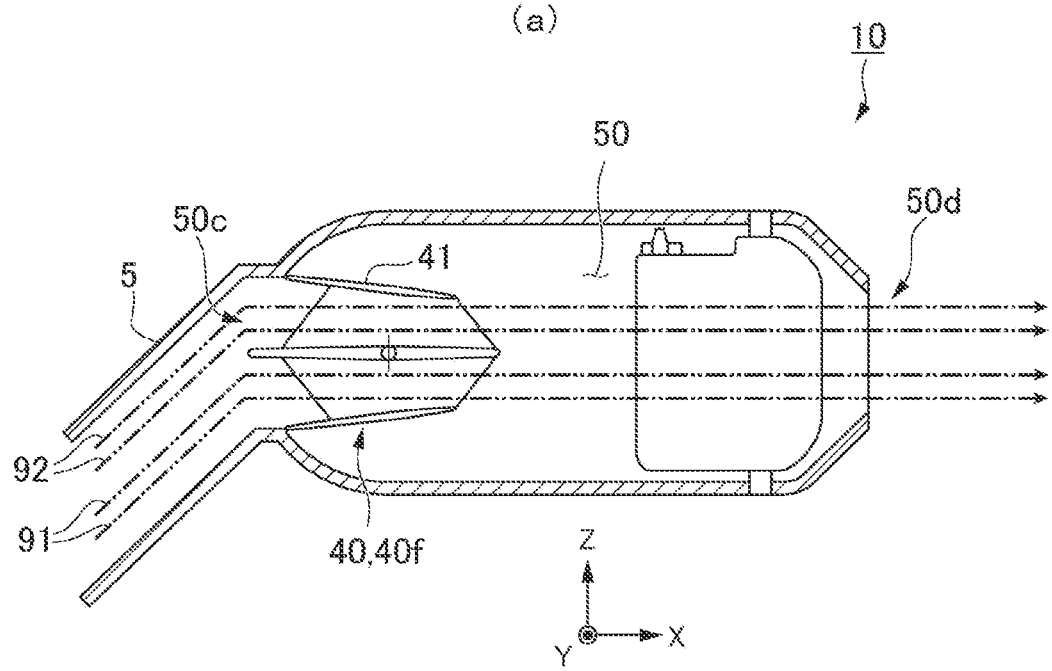
FIG. 8: (a) is an explanatory view of an action of the blowing device in the embodiment and shows a state in which the airflow direction changing device is rotated to the standard position and (b) is a blowing device in a comparative example.
Figure 8:
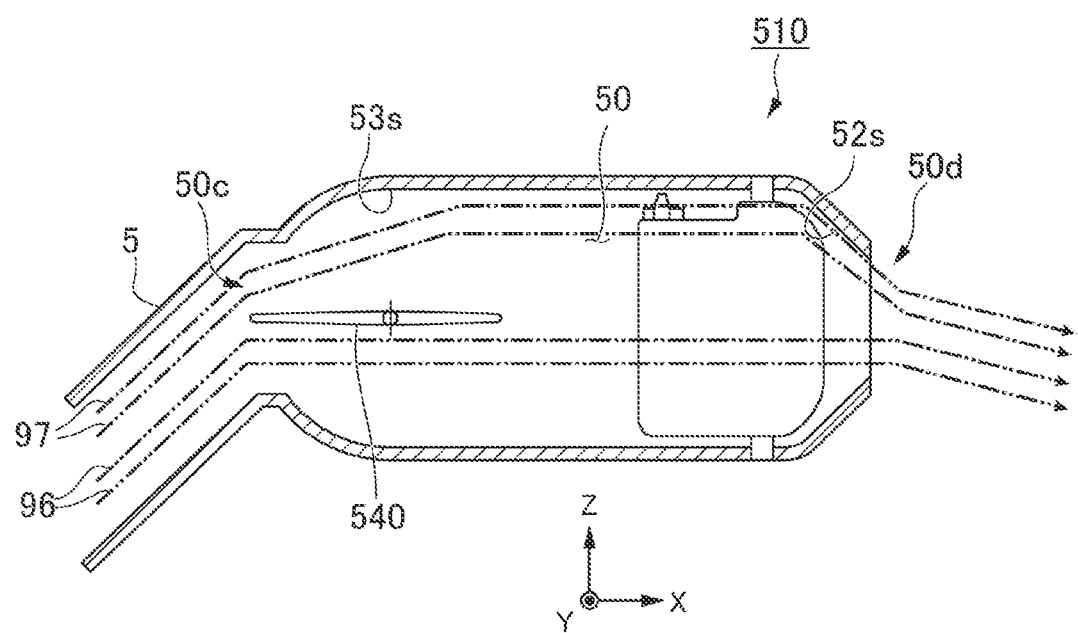

FIG. 8(b) is a cross-sectional view of a blowing device in a comparative example. In FIG. 8(b), a duct 5 is connected to an inlet port 50c of a blowing device 510 in the comparative example. The duct 5 is inclined in the +Z direction while extending in the +X direction and is connected to the inlet port 50c. In FIG. 8(b), a fin 540 is rotated to the standard position. The airflow direction of wind 96 which has flowed from the duct 5 into a ventilating flow path 50 in the −Z direction (lower half portion) is changed in the +X direction through the fin 540. However, the airflow direction of wind 97 which has flowed from the duct 5 into the ventilating flow path 50 in the +Z direction (upper half portion) is not changed by the fin 540. For this reason, the wind 97 travels in an inclination direction of the duct 5 and collides with an intermediate portion 53s in the +Z direction of a case 20. In addition, the wind 97 flows along surfaces of the intermediate portion 53s and a second inclined portion 52s and is blown out at an inclination in a predetermined direction from an outlet port 50d. In this way, in the blowing device 510 in the comparative example, it is difficult to control the airflow direction when the inclined duct 5 is connected.

On the other hand, the blowing device 10 in the embodiment shown in FIG. 8(a) includes a plurality of fins 40f. Particularly, as shown in FIG. 4, an interval W2 between an end portion 41c of a first fin 41 in the −X direction and an end portion 42c of a second fin 42 in the −X direction is set to an opening width W1 or more of an inlet port 50c in the Z direction. According to this constitution, as shown in FIG. 8(a), airflow directions of both winds 91 and 92 flowing into the ventilating flow path 50 are changed by the plurality of fins 40f. That is to say, the airflow direction of the wind 92 flowing from the duct 5 into the ventilating flow path 50 in the +Z direction (upper half portion) is changed by the first fin 41. Thus, both of the winds 91 and 92 are blown out in the +X direction from the outlet port 50d. Therefore, even when the inclined duct 5 is connected, it is possible to accurately control the airflow direction.

FIG. 5(b) is a cross-sectional view of a blowing device in a modified example in the embodiment. In a blowing device 110 in the modified example, a first fin 141 and a second fin 142 are disposed parallel to an XY plane in the standard state of an airflow direction changing device 140. In this case, an airflow direction of wind 67 which has flowed into both end portions of a ventilating flow path 50 in the Z direction is not changed by the first fin 141 and the second fin 142. For this reason, the wind 67 travels straight in the +X direction or moves forward in +X direction while slightly diffusing. At that time, a part of the wind 67 collides with an inner surface of a case 20 around an outlet port 50d. Thus, a pressure loss occurs and the wind power of blown wind weakens.

On the other hand, in the blowing device 10 in the embodiment shown in FIG. 5(a), in the standard state of an airflow direction changing device 40, the first fin 41 and the second fin 42 are inclined in a direction inward into the case 20 with respect to the X direction. According to this constitution, an airflow direction of the wind 62 which has flowed into both end portions of the ventilating flow path 50 in the Z direction is changed in the direction inward from the case 20 by the first fin 41 and the second fin 42. For this reason, the wind 62 is blown out through the outlet port 50d without colliding with the inner surface of the case 20 around the outlet port 50d. Therefore, it is possible to prevent the wind power of the blown wind from weakening due to a pressure loss.

Figure 9:
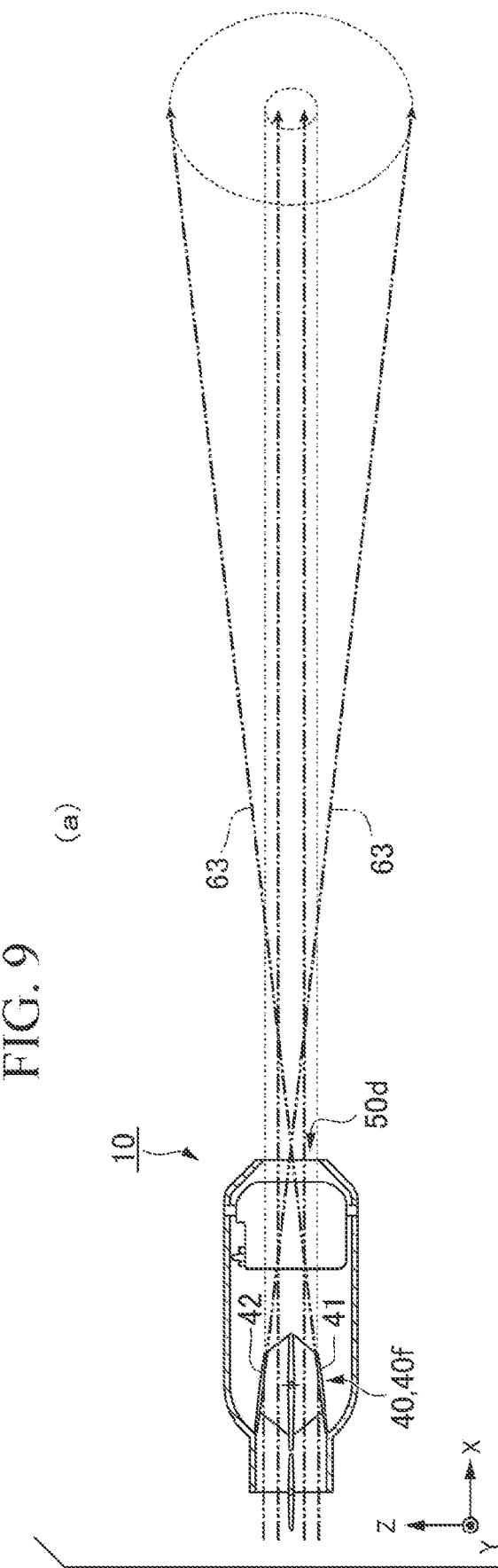
FIG. 9: (a) is an explanatory view of an action of the blowing device in the embodiment and shows a state in which the airflow direction changing device is rotated to the standard position and (b) is a blowing device in a modified example.
Figure 9:
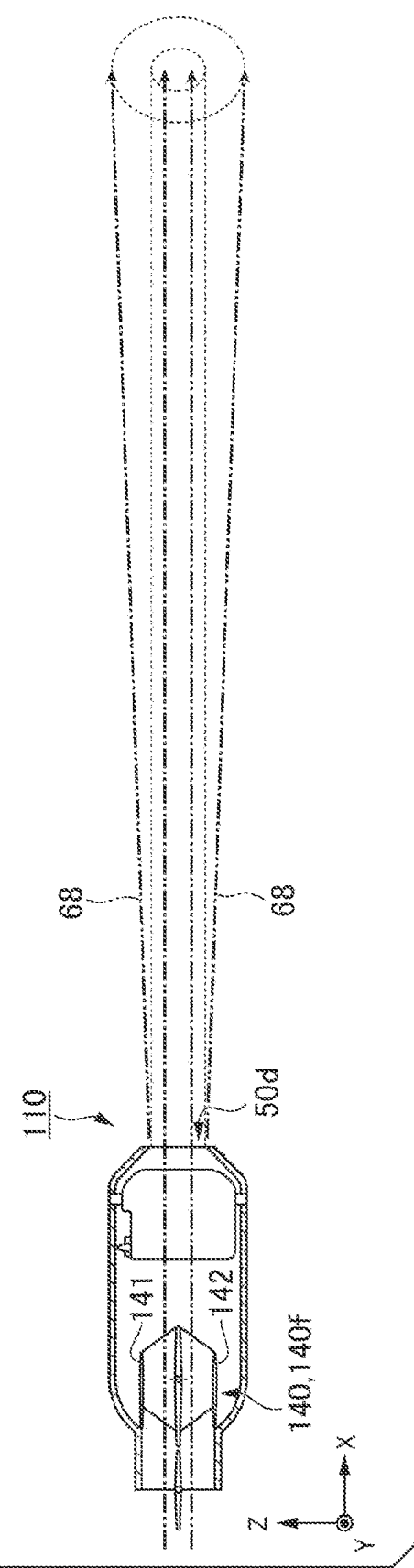

FIG. 9(b) is a cross-sectional view of a blowing device in a modified example in the embodiment. In the blowing device 110 in the modified example, a first fin 141 and a second fin 142 are disposed parallel to an XY plane in the standard state of an airflow direction changing device 140. For this reason, wind 68 blown out through an outlet port 50d moves straight in the +X direction or moves forward in the +X direction while slightly diffusing. However, since the wind 68 hardly spreads in the Z direction, the wind 68 is intensively blown to a narrow region of the vehicle interior. In this case, a wind spot feeling unique to a thin blowing device is generated.

On the other hand, in the blowing device 10 in the embodiment shown in FIG. 9(a), the first fin 41 and the second fin 42 are inclined in the direction inward into the case 20 with respect to the X direction in the standard state of the airflow direction changing device 40. According to this constitution, an airflow direction is changed by the first fin 41 and the second fin 42 and wind 63 blown out through the outlet port 50d moves forward in the +X direction while slightly spreading in the Z direction. Therefore, it is possible to prevent the wind 63 from being intensively blown to a narrow region of the vehicle interior and it is possible to prevent a wind spot feeling from being generated.

As shown in FIG. 4, the plurality of fins 40f in the embodiment includes the intermediate fin 43 disposed between the first fin 41 and the second fin 42 in the Z direction. When the airflow direction changing device 40 is rotated, the intermediate fin 43 efficiently directs wind attempting to move straight in the +X direction in an intended direction.

The intermediate fin 43 is formed to be longer than the first fin 41 and the second fin 42 in the X direction. Thus, when the plurality of fins 40f are inclined to one side, wind escaping to the other side is reduced. Therefore, it is possible to efficiently change an airflow direction of wind flowing into the ventilating flow path 50.

The end portion of the intermediate fin 43 in the −X direction comes into contact with the inlet port 50c at a maximum inclined position of the airflow direction changing device 40. Thus, when the plurality of fins 40f are inclined to one side, wind escaping to the other side is reduced. Therefore, it is possible to efficiently change the airflow direction of the wind flowing into the ventilating flow path 50.

The first inclined portion 51 is formed in a curved surface shape along a movement locus of the end portion in the −X direction of the first fin 41 or the second fin 42. Thus, a gap between the first fin 41 or the second fin 42 and the first inclined portion 51 is small. For this reason, when the plurality of fins 40f are inclined to one side, the outflow of wind to the other side is minimized Therefore, it is possible to accurately control an airflow direction.

Note that the technical scope of the present invention is not limited to the above-described embodiment and includes inventions in which various modifications are added to the above-described embodiment without departing from the gist of the present invention. That is to say, the constitution of the above-described embodiment is merely an example and can be appropriately changed.

In the embodiment, examples of the blowing device include a case in which a longer side direction is the Y direction and a shorter side direction is the Z direction when a cross-sectional shape of the ventilating flow path orthogonal to the X direction is rectangular. Alternatively, examples of a relationship with the vehicle include a case in which the Y direction is the leftward/rightward (width) direction of the vehicle and the Z direction is the upward/downward direction of the vehicle. In this case, this blowing device is applied to the vehicle as a horizontally long blowing device. Thus, it is possible to improve the designability.

On the other hand, this blowing device may be applied to the vehicle as a vertically long blowing device. In this case, the Y direction is the upward/downward direction of the vehicle and the Z direction is the leftward/rightward (width) direction of the vehicle. When this blowing device is applied to the vehicle as a vertically long blowing device, it is possible to save a space in a vehicle width direction. That is to say, it is possible to provide a blowing device suitable for the vehicle having many restrictions in the space in the vehicle width direction.

In the embodiment, examples of the blowing device include a case in which a longer side direction is the Y direction and a shorter side direction is the Z direction when a cross-sectional shape of the ventilating flow path orthogonal to the X direction is rectangular. On the other hand, a shorter side direction may be the Y direction and a longer side direction may be the Z direction. Furthermore, even when a cross-sectional shape of the ventilating flow path orthogonal to the X direction is quadrate, it is possible to apply the blowing device in the embodiment.

INDUSTRIAL APPLICABILITY

It is possible to easily select the left and the right using a switch attached to a housing.

REFERENCE SIGNS LIST

1 Vehicle
1a Vehicle interior
3 Air conditioner
5 Duct
10 Blowing device

20 Case
40 Airflow direction changing device
40f Plurality of fins
41 First fin
42 Second fin
43 Intermediate fin
50 Ventilating flow path
50c Inlet port
50d Outlet port
51 First inclined portion
52 Second inclined portion
53 Intermediate portion

What is claimed is:

1. A blowing device of an air conditioner, comprising:
a case connected to the air conditioner of a vehicle via a duct;
an inlet port provided on the duct side of the case and connected to the duct;
an outlet port provided on a vehicle interior side of the case and configured to blow out wind toward the vehicle interior;
a ventilating flow path formed inside the case through which wind is able to pass in a ventilating direction from the inlet port to the outlet port;
a first inclined portion provided on the inlet port side in the case as part of the case and inclined in a direction outward from the case with respect to the ventilating direction;
a second inclined portion provided on the outlet port side in the case as part of the case and inclined in a direction inward into the case with respect to the ventilating direction;
an intermediate portion formed between the first inclined portion and the second inclined portion in the case as part of the case; and
an airflow direction changing device provided on the inlet port side in the ventilating flow path and capable of changing an airflow direction of an inflow wind through the inlet port toward a space between the outlet port and the intermediate portion and causing the wind to collide with the second inclined portion or the intermediate portion to change an airflow direction in a first direction orthogonal to the ventilating direction,
wherein the airflow direction changing device includes a plurality of fins,
the plurality of fins comprise a first fin and a second fin disposed side by side in the first direction, disposed at both end portions of the inlet port in the first direction and inclining in conjunction with each other,
the first fin and the second fin have states in which the first fin and the second fin are inclined in a direction inward into the case with respect to the ventilating direction.

2. The blowing device of the air conditioner according to claim 1,
an interval in the first direction between an end portion of the first fin on the inlet port side and an end portion of the second fin on the inlet port side is set to an opening width of the inlet port or more in the first direction.

3. The blowing device of the air conditioner according to claim 2, wherein the plurality of fins include an intermediate fin disposed between the first fin and the second fin in the first direction.

4. The blowing device of the air conditioner according to claim 3, wherein the intermediate fin is longer than the first fin and the second fin in the ventilating direction.

5. The blowing device of the air conditioner according to claim 3, wherein an end portion of the intermediate fin on the inlet port side comes into contact with the inlet port at a maximum inclined position of the airflow direction changing device.

6. The blowing device of the air conditioner according to claim 2, wherein the first inclined portion has a curved surface shape along a movement region of the end portion of the first fin or the second fin on the inlet port side.

* * * * *